Figure 1:
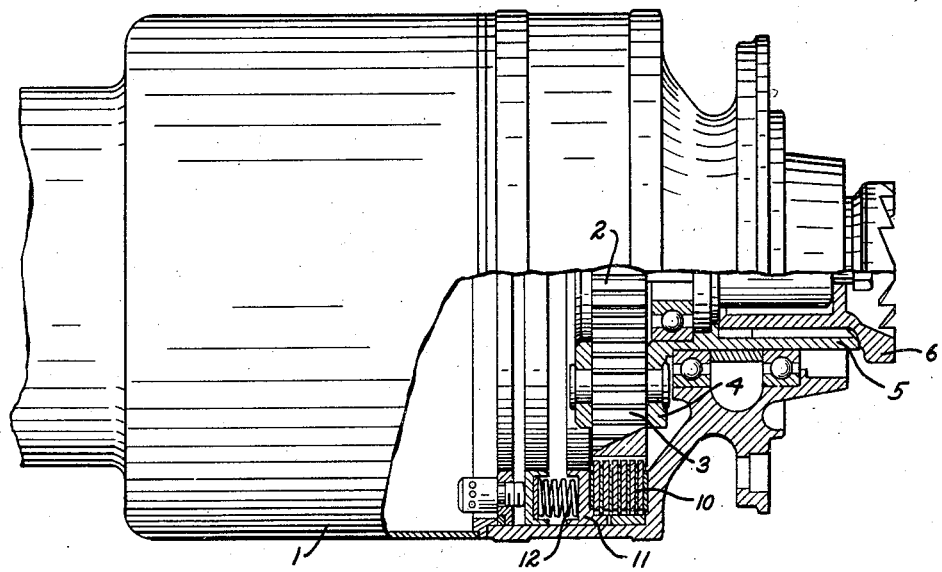

April 22, 1947.   L. D. CAHILL   2,419,253
LUBRICANT
Filed Aug. 7, 1944

INVENTOR.
LYSLE D. CAHILL
BY
Frank N. Harmon
ATTORNEY

Patented Apr. 22, 1947

2,419,253

UNITED STATES PATENT OFFICE 2,419,253

LUBRICANT

Lysle D. Cahill, Shaker Heights, Ohio, assignor, by mesne assignments, to Jack & Heintz Precision Industries, Inc., Cleveland, Ohio, a corporation of Delaware Application August 7, 1944, Serial No. 548,445

4 Claims. (Cl. 252—21)

This invention relates to improvements in the composition of a lubricant and has particular reference to a lubricant for a multiple disc clutch of dissimilar metals.

In aircraft inertia starters the stored kinetic energy of a rapidly rotating flywheel is suddenly released in the form of cranking torque when the rotating starter jaw is brought into positive engagement with the stationary crankshaft of the engine to be started. To accommodate this difference in rotational speeds, a clutch is provided in the starter to allow a certain amount of slippage until the engine has accelerated to cranking speed. In a normal starting operation a considerable amount of energy is consumed in producing such slippage, and under cold weather starting conditions, or when the engine is "frozen" all, or nearly all, of the energy of the flywheel may be dissipated in the clutch in a very short space of time. The clutch also functions at all times as an overload release to limit the maximum stress which may be imposed upon the driving gears.

Thus the demands upon the starter clutch, while ordinarily intermittent and not too severe, may become at times very severe, and successively repeated, if the engine is difficult to start. These operating conditions produce deleterious changes in the clutch plates impairing the smoothness and uniformity of their action and greatly reducing the useful period of their life. It has been customary to make the plates of bronze and steel, interleaved in alternate relation. They have been of various sizes and number, used dry, and with various kinds of lubricant, and the steel plates have been plated with various materials, in attempts to improve the operating characteristics and prolong the life of the clutch.

Three prime operating characteristics of a starter clutch are the ability to hold a predetermined setting through life, and through its operating temperature range, and to maintain a sliding torque approximately the same as breakaway torque. Without lubricant the static friction is too great in relation to the sliding friction. Conventional lubricants have improved this characteristic but have not prevented rapid wear of the bronze plates with consequent variation of the torque setting. After use, it is found that bronze transfers to the steel giving a bronze on bronze wearing surface which causes grabbing and chattering. Plating of the steel discs with a different wearing surface has been found beneficial in certain speed ranges but the present invention attacks the problem from the standpoint of lubrication, and may be practiced with either plated or unplated discs, or with discs of different materials than those mentioned.

The object of the invention is therefore to provide improved lubricating means particularly for, but not restricted to, use in starter clutches and the like. While other uses will suggest themselves to those skilled in the art, the primary objectives of the invention are to overcome the shortcomings above pointed out in multiple disc clutches, to more closely attain ideal operating characteristics, and to extend the useful life of the clutch.

Figure 2:
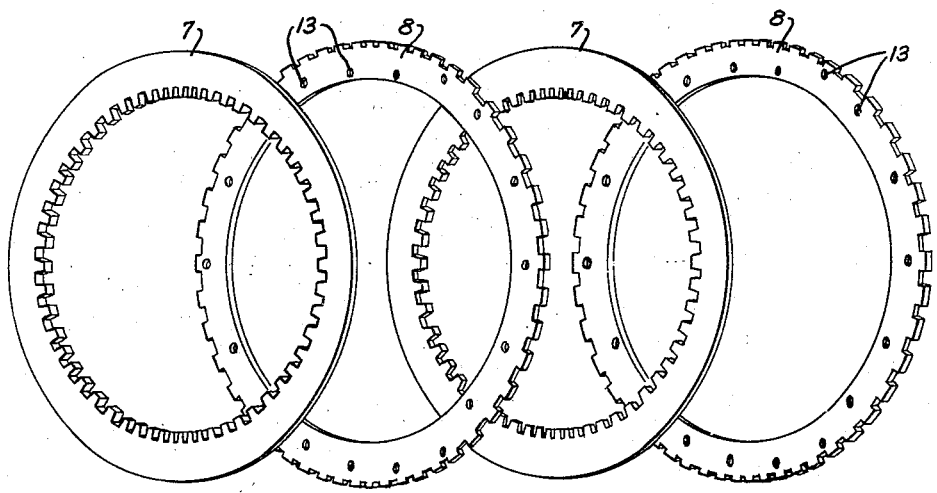

With these and other objects in view the invention will now be described with particular reference to an aircraft starter as illustrated in the accompanying drawing in which:

Figure 1 is a fragmentary view of a starter with parts broken away to show the clutch mechanism, and Figure 2 is an exploded view showing two pairs of plates from the multiple disc clutch.

The numeral 1 designates the starter generally, having a sun gear 2 driving planet gears 3 on a planet carrier, or spider, 4. The spider 4 has a tubular extension 5 carrying an extendable jaw member 6 adapted to engage the crankshaft of the engine to be started. A plurality of internally toothed annular steel clutch discs 7 surround the planetary assembly and constitute a ring gear in mesh with the planet gears 3. Interleaved between the steel discs 7 are bronze discs 8 which are externally splined to prevent their rotation. This stack of alternate discs 7 and 8 constitutes a multiple disc clutch assembly designated generally by the numeral 10, and a pressure plate 11 engaged by a plurality of adjustable compression springs 12 exerts sufficient force upon the assembly to hold the ring gear elements 7 in non-rotative relation to the starter housing for the transmission of torque up to a predetermined maximum value.

Upon the occurrence of an overload value of torque the plates 7 are intended to slip between the fixed plates 8 whereby the planet gears 3 may rotate on their individual axes without requiring the rotation of the planet carrier 4. When the rotation of jaw 6 is prevented by its positive engagement with a stationary crankshaft, the planet carrier 4 cannot revolve and so the planet gears 3 then spin the discs 7 between the discs 8. If the engine refuses to turn over, the entire starting energy is dissipated in this manner in the clutch and, in any event in a normal starting operation, slippage occurs at varying rates until the engine is accelerated to cranking speed, and at any other time when a torque overload occurs.

The starter illustrated in the drawing also exemplifies a general class of power transmission devices having clutch mechanisms of a similar nature to which the present invention is particularly applicable.

In practicing the invention the bronze discs 8 are provided with grease retaining perforations 13 preferably arranged in spiraled groups for uniform distribution of the lubricant. These perforations may be put into the steel discs instead of the bronze discs, if desired.

The present lubricant involves the addition of a fine, pulverulent hard material such as levigated alumina to a grease base, one preferred composition being 1 part of levigated alumina to 200 parts of grease, by weight. Levigated alumina, being a colloidal aluminum oxide, is ordinarily considered as an abrasive or polishing agent but when used in this manner is found to greatly improve the slipping characteristics of the clutch plates and to completely stop the cutting of the bronze plates and the transfer of bronze metal to the steel plates. The results are greatly improved frictional characteristics with respect to smoothness of operation, uniformity of setting throughout the life of the clutch and throughout the operating heat range, closer correlation between break away torque and sliding torque, and greatly prolonged clutch life.

The perforations in the plates retain the lubricating mixture in intimate contact with the sliding surfaces so as to exert a polishing action with each slippage of the plates. Inasmuch as surface polishing consists in making a multitude of extremely fine scratches which remove high points and irregularities of greater relief than the scratches themselves, the theory is advanced that the multitude of these scratches form microscopic lubricant retaining grooves whereby all parts of the sliding surfaces are provided at all times with a ready supply of lubricant which cannot be squeezed out by static force or rubbed off by wiping action. Thus the lubricant is present uniformly over the whole surface before slipping starts, to tend to equalize break-away and sliding frictions, and the extremely close spacing of the minute lubricant channels eliminates any possibility of localized dry spots producing local hot spots capable of transferring particles of bronze to the steel plates. This is believed to account for the marked improvement in smoothness of operation whereby all grabbing and chattering is eliminated. It also appears that the hard particles of levigated alumina become embedded in the relatively soft bronze discs and thus physically prevent the steel from wearing off the bronze surface. This theory is advanced in an attempt to explain the nature and probable mode of operation of the invention in accordance with the requirements of the patent statutes for a full disclosure of the invention, and is not to be interpreted in a limiting sense in the event that a different explanation is later adopted in the art.

Another composition of lubricating mixture comprises the following ingredients in approximately the proportions specified: one part lithopone to 25 parts grease, one part rotten stone to 100 parts grease, and one part levigated alumina to 300 parts grease, all by weight. Improved results have been obtained with this mixture by providing many times the number of perforations 13 shown in Figure 2, notwithstanding the consequent reduction in area of bearing surface. Whereas from past experience it would seem that reducing the load bearing area would increase the rate of wear, the present lubricant produces the unobvious result of reducing the wearing rate and extending the life of the clutch.

The first mixture, involving only levigated alumina and grease, is found to give a very desirable flat characteristic for inertia starters when torque is plotted against time, indicating that the clutch setting is not affected by temperature rise. The second mixture, involving the further addition of lithopone and rotten stone produces a drooping characteristic which is desirable where there is a direct motor drive, in order to reduce the load on the motor in abnormally long periods of use.

The exact proportions are not critical, and they depend to some extent upon the materials comprising the clutch disc surfaces, the contacting areas and pressures involved and the operating speeds. In general, the amounts of added ingredients may be varied from ½ to 4 times the above stated proportions. That is to say that the first formula may be varied from a minimum of 1 part of levigated alumina to 400 parts of grease to a maximum of 1 part levigated alumina to 50 parts of grease. Below the minimum there is no apparent action different from conventional grease, and above the maximum the mixture becomes too abrasive.

In the second formula the quantities of each of lithopone, rotten stone and levigated alumina may be varied from ½ part to 4 parts for the respective quantities of grease specified. In this formula the proportions will be governed in part by the amount of droop desired in the torque-time characteristic. Thus the specified ingredients and proportions are cited by way of example rather than in a limiting sense, and it is within the scope of the invention to substitute or add other hard substances having polishing properties which are effective to produce the results herein described.

The grease base to which these materials are added should be any conventional grease which is reliably recommended for the particular use and may be a graphite loaded grease. The presence of graphite in a grease does not in itself produce the results accomplished by the present invention, nor does it interfere with the action of the additional ingredients.

I claim:

1. In combination in a friction clutch assembly having a plurality of clutch discs with friction surfaces, a lubricant between said surfaces, said lubricant consisting essentially of a grease base having mechanically suspended therein a finely divided, impalpable solid scarifying agent for making minute grease-retaining scratches on a wearing surface lubricated thereby, whereby said lubricant will not be completely squeezed out or rubbed off said surface by the imposition of frictional loads thereon, the proportions of the elements of said lubricant being approximately one part by weight of said agent with 200 parts of grease.

2. In combination in a multiple disc friction clutch assembly having relatively hard friction discs and relatively soft friction discs, a lubricant between said friction surfaces of said discs, said lubricant consisting essentially of a grease base in which there is mechanically suspended a scarifying agent made of a finely divided solid material of greater hardness than said harder discs which is adapted to imbed itself in the softer discs to prevent wear thereof by the harder discs, the proportions of the elements of said lubricant being approximately one part by weight of said agent with 200 parts of grease.

3. A lubricant for interposition between friction clutch surfaces consisting essentially of a mixture of approximately 12 parts by weight of lithopone, 3 parts of rotten stone, and 1 part of levigated alumina, to 300 parts of grease.

4. A lubricant for interposition between friction clutch surfaces consisting essentially of a mixture of from 6 to 48 parts by weight of lithopone, 1½ to 12 parts of rotten stone, and ½ to 4 parts of levigated alumina, to 300 parts of grease.

LYSLE D. CAHILL.

REFERENCES CITED

The following references are of record in the file of this patent:

UNITED STATES PATENTS

| Number | Name | Date |
|---|---|---|
| 1,669,596 | Browne | May 15, 1928 |
| 1,806,414 | Patten | May 19, 1931 |
| 2,270,888 | Murray et al. | Jan. 27, 1942 |
| 2,285,453 | Merkle | June 9, 1942 |
| 1,855,195 | McClaughry | Apr. 26, 1932 |
| 1,491,127 | Behr | Apr. 22, 1924 |
| 1,463,501 | Buttenfield | July 31, 1923 |
| 1,003,983 | Callahan | Sept. 26, 1911 |
| 136,945 | Tonner | Mar. 18, 1873 |

FOREIGN PATENTS

| Number | Country | Date |
|---|---|---|
| 5,344 | British | 1881 |
| 1,938 | British | 1912 |

OTHER REFERENCES

Klemgard—Lubricating Greases, pub. 1937 by Reinhold Pub. Corp. of N. Y., page 720. (Copy in Div. 64.)